United States Patent [19]

Bartlett

[11] Patent Number: 4,604,226

[45] Date of Patent: Aug. 5, 1986

[54] AEROSOL CORROSION INHIBITORS

[75] Inventor: Philip L. Bartlett, Wilmington, Del.

[73] Assignee: E. I. Du Pont de Nemours and Company, Wilmington, Del.

[21] Appl. No.: 714,811

[22] Filed: Mar. 22, 1985

[51] Int. Cl.[4] .................. C09K 3/00; A01N 25/06; A61K 47/00

[52] U.S. Cl. .................. 252/389 A; 252/390; 252/392; 424/45; 424/47; 424/126

[58] Field of Search .................. 252/389.21, 390, 392, 252/305; 424/45, 47, 126

[56] References Cited

U.S. PATENT DOCUMENTS

| | | | |
|---|---|---|---|
| 2,060,138 | 11/1936 | Taylor | 252/5 |
| 2,863,746 | 12/1958 | Cantrell et al. | 252/389.21 X |
| 3,079,339 | 2/1963 | Cantrell et al. | 252/389.21 X |
| 3,228,758 | 1/1966 | Bauer | 252/392 X |
| 3,397,150 | 8/1968 | Burt et al. | 252/389.21 X |
| 3,516,922 | 6/1970 | Anzilotti | 252/389.21 X |
| 3,642,653 | 2/1972 | Northan et al. | 252/305 X |
| 3,650,981 | 3/1972 | Inouye et al. | 252/305 X |
| 3,785,975 | 1/1974 | Humphrey et al. | 252/392 X |
| 4,263,275 | 4/1981 | Nandagiri | 424/47 |

FOREIGN PATENT DOCUMENTS

| | | | |
|---|---|---|---|
| 5682869 | 12/1979 | Japan . | |
| 5682870 | 12/1979 | Japan . | |
| 2028364 | 3/1980 | United Kingdom | 252/305 |

OTHER PUBLICATIONS

"Corrosion and Inhibitors in Aerosols", C. W. West, *Soap and Chemical Specialties*, 42(9), 66–9 (1966).

Primary Examiner—John F. Terapane
Assistant Examiner—Matthew A. Thexton

[57] ABSTRACT

Corrosion inhibitor compositions comprising a mixture of an amine neutralized phosphate ester and a volatile amine selected from the group consisting of cyclohexylamine, morpholine and isopropylamine. Such compositions are useful in inhibiting corrosion on the interior surfaces of tin-plated aerosol cans containing water-based aerosol formulations.

6 Claims, No Drawings

AEROSOL CORROSION INHIBITORS

BACKGROUND OF THE INVENTION

1. Field of the Invention

This invention relates to corrosion inhibitor compositions which are useful in inhibiting corrosion in aerosol products.

2. Description of the Prior Art

Many products designed for household, personal, automotive and other types of use are available as aerosol products. Typical examples of such products include personal products such as hair care products (sprays, coloring agents and styling/conditioning mousses), deodorants, antiperspirants, first aid sprays, and colognes; household products such as waxes, polishes, pan sprays, insecticides and room fresheners; automotive products such as cleaners and polishes; industrial products such as cleaners, lubricants and mold release agents; and animal care products such as tick and flea repellents.

Although some aerosol products are packaged in glass bottles or aluminum cans or lined steel cans, most formulations are loaded into unlined cans made of tin-plated steel. While the tin affords protection against corrosion, the thinness of the coating, imperfections in the surface, wear and tear, and chemical action may ultimately expose the steel to the contents of the can and corrosion can result. When aerosol formulations contain less than about 80 ppm (parts per million) water, corrosion of tin-plate cans is not generally a serious problem. However, if the water content of an aerosol formulation is more than 80 ppm, problems due to corrosion are more likely to occur.

The introduction of dimethyl ether (DME) as an aerosol propellant has opened the way to the use of more water-based aerosol formulations and made possible the manufacture of products of lesser flammability and lower ingredient cost. However, the use of water in such aerosol formulations also increases the problem of corrosion on the interior of the tin-plated steel cans which are so widely used, thus leading to contamination of the aerosol product and ultimately to leaking of the can if corrosion is severe enough. For this reason, corrosion inhibitors are used with aerosol propellants containing DME, when this propellant is to be used in tin-plated steel cans containing a water-based formulation.

The matter of inhibiting corrosion in an aerosol can presents the dual problem of achieving corrosion inhibition in a system where there is both liquid and vapor phase contact with the metal. In a system that contains DME and water, corrosion of the can in areas in contact with the vapor phase is aggravated by the fact that relatively large amounts of water vapor are present along with the DME propellant in the vapor space above the liquid contents of the container. For example, the vapor phase of a 95/5 wt % dimethyl ether/water system contains 7,750 ppm water vapor of 70° F. (21.1° C.). Moreover, the addition of ethanol to a DME/water system will often exacerbate the problem of vapor phase corrosion. A 90/5/5 (wt %) DME/ethanol/water system will contain 9,100 ppm water vapor at 70° F.

SUMMARY OF THE INVENTION

Many commercially available corrosion inhibitors are either ineffective for aerosol systems containing DME or they fail to provide adequate protection against both liquid phase and vapor phase corrosion. It often happens that a corrosion inhibitor gives good protection where the liquid phase is in contact with the can but fails to provide protection in areas where the interior surfaces of the can are in contact with vapor during storage. The reverse can also occur where the inhibitor gives good protection on the interior where there is contact with vapor, but poor protection where liquid normally contacts the container. The present invention provides an improvement in aerosol compositions containing an aqueous aerosol-dispersible media and a propellant gas in which the improvement comprises the presence of a corrosion inhibitor in the aerosol composition in a minor amount sufficient to provide corrosion inhibition to the composition. The corrosion inhibitor which constitutes the improvement in the aerosol composition is effective against both vapor phase and liquid phase corrosion, and it is comprised of about 15 to 85 wt % of an amine neutralized phosphate ester selected from the group consisting of 2-ethylhexylamine salt of mixed mono- and di-isooctyl acid phosphate, tertiary $C_{12-14}$ alkyl primary amine salt of mixed mono- and di-isooctyl acid phosphate, diethylamine salt of mixed mono- and di-butoxyethyl acid phosphate and 2-ethylhexylamine salt of mixed mono- and di-tridecyl acid phosphate and 85 to 15 wt % of a volatile amine selected from the group consisting of cyclohexylamine, isopropylamine and morpholine. Such corrosion inhibitors are useful in a wide variety of aerosol compositions where there is a need to protect the container from corrosive attack. As a general rule, this includes aerosol compositions in which the formulation is water-based. Because of the compatibility of DME with water, it is common in the aerosol industry to use DME as the propellant gas either alone or in combination with other well known aerosol propellants. Propellants such as, 1,1-difluoroethane (FC-152a), hydrocarbons such as butane, isobutane and propane and compressed gases such as $CO_2$ and nitrogen and mixtures of these propellants can be used in water-based aerosol formulations with or without DME. The corrosion inhibitor compositions of this invention can be used in aerosols containing any of these propellants or combinations thereof. The introduction of the inhibitor into the propellant prior to loading into the aerosol can is a convenient way to incorporate the inhibitor into the final aerosol formulation, and therefore, one of the objects of the invention to provide aerosol propellant compositions containing one or more propellants, such as those described above, in combination with the corrosion inhibitor in an amount sufficient to provide corrosion inhibition in water-based aerosols.

The effectiveness of the two components of the corrosion inhibitor compositions of the invention is not additive or supplementary but is greater than expected or predicted from the performance of the individual ingredients. Thus, neither the amine neutralized phosphate esters nor the volatile amines performed entirely satisfactorily as corrosion inhibitors in the liquid or the vapor phase of the aerosol formulations evaluated. Hence, it is clear that the effectiveness of the corrosion inhibitor compositions of the invention is not simply the result of blending liquid phase and vapor phase inhibitors.

DETAILED DESCRIPTION

All of the components of the corrosion inhibitor composition of the invention are commercially available materials. On the other hand, if one wishes to prepare the amine neutralized phosphate esters, this can be achieved by the addition of $P_2O_5$ to an alcohol, such as isooctyl alcohol, at a rate which will allow the temperature to be maintained in the range of about 50° to 55° C. Reaction occurs in the ratio of three mols of alcohol to one mol of $P_2O_5$ thus producing a mixture of mono- and di-esters in a mol ratio of 1:1. The ester mixture thus obtained is then neutralized by contacting the mixture with an amine, such as 2-ethylhexyl amine or diethyl amine, in an amount that will provide one mol of amine for each equivalent of phosphate ester, assuming the equivalent weight of the ester to be the average of the molecular weights of the mono- and di-esters. The chemical reactions for the preparation are as follows:

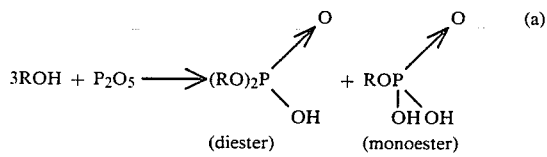
(a)

where R is either $C_8H_{17}$, $C_{13}H_{27}$ or $C_4H_9OCH_2CH_2$

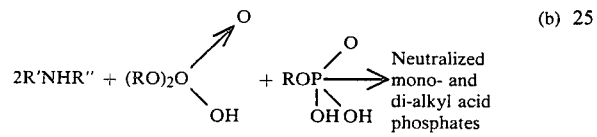
(b)

where
R' is either $C_2H_5$, $C_8H_{17}$ or tertiary $C_{12-14}$ alkyl and R'' is H or $C_2H_5$.

One of the preferred amines for neutralization of the acid phosphates is a mixture comprising principally tertiary $C_{12-14}$ branched alkyl primary amines in the molecular weight range of 185–213 with a neutralization equivalent of 191. Such a mixture is available commercially as "Primene 81-R".

The proportion of the two constituents that form the inhibitor composition can be in the range of 15 to 85 wt % amine neutralized phosphate ester and 85 to 15 wt % volatile amine. A preferred range is 40 to 60 wt % phosphate ester and 60 to 40 wt % of the amine. A 50/50 mixture by weight is a preferred composition. The optimum concentration of inhibitor composition needed to obtain effective corrosion inhibition will, of course, vary with the formulation in which it is to be used, and it can be determined by storage tests, such as those described in the Examples. Generally, the effective concentration range is 0.15 to 2 wt % based on the total weight of the aerosol formulation including the weight of a propellant as well as the weight of the other ingredients. A preferred weight range is 0.15 to 0.5 wt % of the aerosol formulation. The inhibitors can be added directly to the aerosol can either alone or mixed with other non-pressurized ingredients, or if preferred, they can be introduced as solutions in the propellant in an amount which when incorporated with the other ingredients will provide the desired 0.15 to 2 wt % of corrosion inhibitor in the final composition.

The composition of the aqueous aerosol-dispersible media which is, in essence, the formulation containing the active ingredients, will, quite naturally, depend upon the use for which the aerosol is designed. Such formulations are well known to persons skilled in the art, and the choice of formulation is not critical to the use of the invention so long as the medium is compatible with the components of the inhibitor composition, particularly the volatile amines. The use of the corrosion inhibitors in tin-plated cans with dry-type antiperspirants containing aluminum chlorohydrate is not recommended. Lined cans should be used in these instances.

EXAMPLES

Sixty-day corrosion tests at 120° F. (48.9° C.) were run on the corrosion inhibitors in three aerosol formulations. These formulations were selected as being representative of commercial products, in their chemical compositions. Distilled water was used in each of the five formulations because it was readily available in the laboratory. However, similar results would be expected with deionized water which is often used in commercial aerosols.

| Component | Wt. % |
|---|---|
| Formulation No. 1 Room Freshener (pH = 6) | |
| Rose fragrance | 1.40 |
| Ethanol (SDA 40-1) | 19.60 |
| Water (distilled) | 49.00 |
| Dimethyl ether | 30.00 |
| Formulation No. 2 Insecticide (pH = 6) | |
| Natural pyrethrins | 1.50 |
| Piperonyl butoxide | 0.65 |
| Polyglyceryl fatty acid ester surfactant ("Witconol 14" Witco Chemical Corp.) | 0.97 |
| Ethanol (SDA 40-1) | 10.01 |
| Water (distilled) | 51.87 |
| Dimethyl ether | 35.00 |
| Formulation No. 3 Insecticide (pH = 5) | |
| Phosphorothioic acid O, O—diethyl O—(3,5,6-trichloro-2-pyridyl) ester | 0.98 |
| Natural pyrethrins | 0.06 |
| Piperonyl butoxide | 0.13 |
| Polyglyceryl fatty acid ester surfactant | 0.20 |
| Water (distilled) | 63.63 |
| Dimethyl ether | 35.00 |

Procedure

All of the examples were prepared using the following procedure. The active ingredients were weighed individually into an eight-ounce three-piece aerosol can $2\frac{1}{8}$" in diameter and 5-9/16 " long, except when the corrosion inhibitors were added to the aerosol can as a solution in the propellant (noted in tables). The can was purged with dichlorodifluoromethane (FC-12) vapor to displace the air in the container. The aerosol can valve was then placed into the can and crimped. The propellants were introduced into the can as liquids through the aerosol valve. Volume amounts corresponding to the weights of the propellants were calculated prior to loading, and a glass, calibrated, pressure buret was used to measure and transfer the liquids from storage cylinders to the can. A nitrogen gas pressure of 100 psig was applied to the buret to aid in transferring the liquids from the buret to the can. After the propellant was loaded, the can was weighed, and the weight of propellant recorded.

The aerosol cans used in the corrosion tests were commercially available containers and are described in trade literature as: one inch round dome top unlined aerosol containers, size 202×509 ($2\frac{1}{8}$" diameter, 5-9/16"

can wall height), 0.25 lb. electrolytic tin-plated (ETP), full concave bottom with welded side seam.

A corrosion test rating system was used which provides a complete visual description of the appearance of the interior surface of the tin-plated steel aerosol cans after 60 days storage at 120° F.

| CAN CORROSION - RATING SYSTEM | |
|---|---|
| Rating* | Description |
| 0 | No Corrosion |
| 1 | Trace Corrosion |
| 2 | Light Corrosion |
| 3 | Moderate Corrosion |
| 4 | Heavy Corrosion |
| 5 | Severe Corrosion |

*This numerical rating is an overall assessment of the total can (tin-plate, joints and side seams) and represents the primary rating of a test. A rating of 0-2 is considered effective and 3 or greater is a failed rating.

TABLE NO. 1

| | | CORROSION TEST DATA | | | |
|---|---|---|---|---|---|
| Corrosion Inhibitor | Wt. % | Corrosion Test Procedure | Corrosion Test Medium | Test Rating | Description of Test Can Corrosion |
| NONE | — | 60 days at 120° F. | Formulation No. 2 | 5 | Severe detinning in liquid and vapor phase; considerable vapor phase corrosion |
| 2-Ethylhexylamine salt of mixed mono- and di-isooctyl acid phosphate | 0.50 | 60 days at 120° F. | Formulation No. 2 | 2 | Light vapor phase corrosion |
| 2-Ethylhexylamine salt of mixed mono- and di-tridecyl acid phosphate | " | 60 days at 120° F. | Formulation No. 2 | 2 | Light vapor phase corrosion |
| Tertiary $C_{12-14}$ alkyl primary amine salt of mixed mono- and di-isooctyl acid phosphate | " | 60 days at 120° F. | Formulation No. 2 | 3 | Moderate vapor phase corrosion |
| Cyclohexylamine | 0.50 | 60 Days at 120° F. | Formulation No. 2 | 3 | Detinning at bottom joint; some vapor phase rusting |
| Isopropylamine | " | 60 Days at 120° F. | Formulation No. 2 | 4 | Moderate to severe vapor phase corrosion; liquid phase detinning |
| Morpholine | " | 60 Days at 120° F. | Formulation No. 2 | 3 | Detinning in liquid phase; vapor phase corrosion |
| 2-Ethylhexylamine salt of mixed mono- and di-isooctyl acid phosphate | 0.25 | 60 Days | Formulation | 0 | No corrosion |
| Cyclohexylamine | 0.25 | | | | |
| 2-Ethylhexylamine salt of mixed mono- and di-isooctyl acid phosphate | 0.25 | 60 Days at 120° F. | Formulation No. 2 | 0 | No corrosion |
| Morpholine | 0.25 | | | | |
| 2-Ethylhexylamine salt of mixed mono- and di-tridecyl acid phosphate | 0.25 | 60 Days at 120° F. | Formulation No. 2 | 0 | No corrosion |
| Isopropylamine | 0.25 | | | | |
| Tertiary $C_{12-14}$ alkyl primary amine salt of mixed mono- and di-isooctyl acid phosphate | 0.10 | 60 Days at 120° F. | Formulation No. 2 | 0 | No Corrosion |
| Morpholine | 0.10 | | | | |
| Tertiary $C_{12-14}$ alkyl primary amine salt of mixed mono- and di-isooctyl acid phosphate | 0.25 | 60 Days at 120° F. | Formulation No. 2 | 0 | No Corrosion |
| Morpholine | 0.25 | | | | |
| Tertiary $C_{12-14}$ alkyl primary amine salt of mixed mono- and di-isooctyl acid phosphate | 0.50 | 60 Days at 120° F. | Formulation No. 2 | 0 | No Corrosion |
| Morpholine | 0.50 | | | | |
| Tertiary $C_{12-14}$ alkyl primary amine | 1.00 | 60 Days at 120° F. | Formulation No. 2 | 1 | Trace of Vapor Phase Corrosion |

TABLE NO. 1-continued

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| salt of mixed mono- and di-isooctyl acid phosphate | | | | | |
| Morpholine | 1.00 | | | | |
| Tertiary $C_{12-14}$ alkyl primary amine salt of mixed mono- and di-isooctyl acid phosphate | 0.10 | 60 days at 120° F. | Formulation No. 2 | 1 | Trace of Vapor Phase Corrosion |
| Morpholine | 0.50 | | | | |
| Tertiary $C_{12-14}$ alkyl primary amine salt of mixed mono- and di-isooctyl acid phosphate | 0.25 | 60 days at 120° F. | Formulation No. 2 | 1 | Trace of Vapor Phase Corrosion |
| Morpholine | 0.50 | | | | |
| Tertiary $C_{12-14}$ alkyl primary amine salt of mixed mono- and di-isooctyl acid phosphate | 0.50 | 60 days at 120° F. | Formulation No. 2 | 0 | No Corrosion |
| Morpholine | 0.10 | | | | |
| Tertiary $C_{12-14}$ alkyl primary amine salt of mixed mono- and di-isooctyl acid phosphate | $0.50^a$ | 60 Days at 120° F. | Formulation No. 2 | 0 | No Corrosion |
| Morpholine | 0.10 | | | | |
| Tertiary $C_{12-14}$ alkyl primary amine salt of mixed mono- and di-isooctyl acid phosphate | 0.50 | 60 Days at 120° F. | Formulation No. 2 | 0 | No Corrosion |
| Morpholine | 0.25 | | | | |
| Tertiary $C_{12-14}$ alkyl primary amine salt of mixed mono- and di-isooctyl acid phosphate | $0.50^a$ | 60 Days at 120° F. | Formulation No. 2 | 0 | No Corrosion |
| Morpholine | 0.25 | | | | |

$^a$Corrosion inhibitors were dissolved in propellant and added to aerosol can as propellant solution. In all other examples, corrosion inhibitors and propellants were added individually to aerosol can.

TABLE NO. 2

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| NONE | — | 60 days at 120° F. | Formulation No. 3 | 5 | Severe corrosion in liquid and vapor phase |
| 2-Ethylhexylamine salt of mixed mono- and di-isooctyl acid phosphate | 0.50 | 60 days at 120° F. | Formulation No. 3 | 2 | Light vapor phase corrosion |
| 2-Ethylhexylamine salt of mixed mono- and di-tridecyl acid phosphate | 0.50 | 60 days at 120° F. | Formulation No. 3 | 2 | Light vapor phase corrosion |
| Cyclohexylamine | 0.50 | 60 days at 120° F. | Formulation No. 3 | 4 | Moderate to severe vapor phase corrosion; liquid phase detinning |
| Isopropylamine | 0.50 | 60 days at 120° F. | Formulation No. 3 | 4 | Moderate to severe vapor phase corrosion; liquid phase detinning |
| Morpholine | 0.50 | 60 days at 120° F. | Formulation No. 3 | 4 | Moderate to severe vapor phase corrosion; liquid phase detinning |
| 2-Ethylhexylamine salt of mixed mono- and di-isooctyl acid phosphate | 0.25 | 60 Days at 120° F. | Formulation No. 3 | 0 | No corrosion |

TABLE NO. 2-continued

| | | CORROSION TEST DATA | | | |
|---|---|---|---|---|---|
| Corrosion Inhibitor | Wt. % | Corrosion Test Procedure | Corrosion Test Medium | Test Rating | Description of Test Can Corrosion |
| Cyclohexylamine | 0.25 | | | | |
| 2-Ethylhexylamine salt of mixed mono- and di-tridecyl acid phosphate | 0.25 | 60 Days at 120° F. | Formulation No. 3 | 0 | No corrosion |
| Isopropylamine | 0.25 | | | | |
| 2-Ethylhexylamine salt of mixed mono- and di-isooctyl acid phosphate | 0.25 | 60 Days at 120° F. | Formulation No. 3 | 0 | No corrosion |
| Morpholine | 0.25 | | | | |

TABLE NO. 3

| | | CORROSION TEST DATA | | | |
|---|---|---|---|---|---|
| Corrosion Inhibitor | Wt. % | Corrosion Test Procedure | Corrosion Test Medium | Test Rating | Description of Test Can Corrosion |
| NONE | — | 60 days at 120° F. | Formulation No. 1 | 5 | Brown/red residue on walls; pitting on valve cup; detinning in vapor phase and on can bottom |
| Tertiary $C_{12-14}$ alkyl primary amine salt of mixed mono- and di-isooctyl acid phosphate | 0.50 | 60 days at 120° F. | Formulation No. 1 | 3 | Moderate vapor phase corrosion |
| Cyclohexylamine | 0.50 | 60 days at 120° F. | Formulation No. 1 | 4 | Detinning in both phases; some vapor phase corrosion |
| Tertiary $C_{12-14}$ alkyl primary amine salt of mixed mono- and di-isooctyl acid phosphate | 0.25 | 60 days at 120° F. | Formulation No. 1 | 2 | Light vapor phase corrosion |
| Cyclohexylamine | 0.25 | | | | |
| Tertiary $C_{12-14}$ alkyl primary amine salt of mixed mono- and di-isooctyl acid phosphate | 0.50 | 60 days at 120° F. | Formulation No. 1 | 1 | Slight vapor phase corrosion |
| Cyclohexylamine | 0.50 | | | | |

I claim:

1. In an aerosol composition packaged in a tin-plated steel can containing an aqueous aerosol-dispersible medium and a propellant, the improvement which comprises the presence of the combination of:

15 wt % to 85 wt % of an amine neutralized phosphate ester selected from the group consisting of 2-ethylhexylamine salt of mixed mono- and di-isooctyl acid phosphate, tertiary $C_{12-14}$ alkyl primary amine salt of mixed mono- and di-isooctyl acid phosphate, diethylamine salt of mixed mono- and di-butoxyethyl acid phosphate and 2-ethylhexylamine salt of mixed mono- and di-tridecyl acid phosphate, and 85 wt % to 15 wt % of a volatile amine selected from the group consisting of cyclohexylamine, morpholine, and isopropylamine in an amount sufficient to prevent more than light corrosion to a tin-plated steel aerosol can containing said aerosol composition.

2. The composition of claim 1 in which the amine neutralized phosphate ester is the 2-ethylhexylamine salt of mixed mono- and di-isooctyl acid phosphate and the volatile amine is cyclohexylamine.

3. The composition of claim 1 in which the amine neutralized phosphate ester is the 2-ethylhexylamine salt of mixed mono- and di-isooctyl acid phosphate and the volatile amine is morpholine.

4. The composition of claim 1 in which the amine neutralized phosphate ester is the 2-ethylhexylamine salt of mixed mono- and di-tridecyl acid phosphate and the volatile amine is isopropylamine.

5. The composition of claim 1 in which the amine neutralized phosphate ester is the tertiary $C_{12-14}$ alkyl primary amine salt of mixed mono- and di-isooctyl acid phosphate and the volatile amine is morpholine.

6. The composition of claim 1 in which the amine neutralized phosphate ester is tertiary $C_{12-14}$ alkyl primary amine salt of mixed mono- and di-isooctyl acid phosphate and the volatile amine is cyclohexylamine.

* * * * *